Dec. 1, 1964  D. D. DE FORD  3,159,019
CHROMATOGRAPHIC ANALYSIS METHOD
Filed July 17, 1959

SPLITTER COLUMN 10

THERMOCHROMATOGRAPHIC COLUMN 22

ELUTION COLUMN 29

INVENTOR.
D. D. DEFORD
BY Hudson & Young
ATTORNEYS

United States Patent Office 3,159,019
Patented Dec. 1, 1964

3,159,019
CHROMATOGRAPHIC ANALYSIS METHOD
Donald D. De Ford, Glenview, Ill., assignor to Phillips Petroleum Company, a corporation of Delaware
Filed July 17, 1959, Ser. No. 827,856
3 Claims. (Cl. 73—23)

This invention relates to the analysis of fluid streams.

In various industrial and laboratory operations, there is a need for analytical procedures which are capable of measuring small concentrations of constituents of fluid streams. One analytical procedure which is becoming quite valuable at the present time for making such analyses involves elution chromatography. In elution chromatography, a sample of the material to be analyzed is introduced into a column which contains a selective sorbent. A carrier gas is directed into the column so as to force the sample material therethrough. The sorbent attempts to hold the constituents of the mixture, whereas the carrier gas tends to force the constituents through the column. This results in the several constituents of the fluid mixture travelling through the column at different rates of speed, depending upon their affinities for the packing material. The column effluent thus consists initially of the carrier gas alone, the individual constituents of the fluid mixture appearing later at spaced time intervals. It is common practice to detect these constituents by means of a thermal conductivity analyzer which compares the thermal conductivity of the effluent gas with the thermal conductivity of the carrier gas directed to the column.

Analyzers of this general type have proved to be quite useful in the analysis of fluid mixtures. However, it is difficult to detect constituents which are present in small concentrations, particularly when these constituents have approximately the same affinity for the column packing material as do the other constituents of the fluid mixture which are present in larger concentrations. It is often impossible to analyze such fluid mixtures in a reasonable length of time because the constituents can not be separated from one another without the use of an excessively long column.

The present invention provides an improved analysis procedure which utilizes the principles of chromatography. A fluid mixture to be analyzed is introduced into a first column which is operated as a conventional elution chromatography column. A part of the effluent from the first column, which contains the components to be detected that are present in small concentrations, is passed to one or more additional columns as the fluid sample. In one specific embodiment, the second column comprises a thermo-chromatography column which is operated in such a manner as to concentrate the sample supplied thereto. This concentrated sample is introduced into a third column wherein it is again separated. This procedure permits constituents which are present in small concentrations in a fluid mixture to be measured precisely in a reasonable length of time.

Accordingly, it is an object of this invention to provide an improved method of analyzing fluid mixtures.

A further object is to provide a novel method of detecting constituents in fluid mixtures which are present in small concentrations by the use of a plurality of chromatographic columns.

A further object is to provide novel apparatus for separating and analyzing fluid mixtures.

Other objects, advantages and features of the invention should become apparent from the following detailed description which is taken in conjunction with the accompanying drawing in which.

Figure 1:
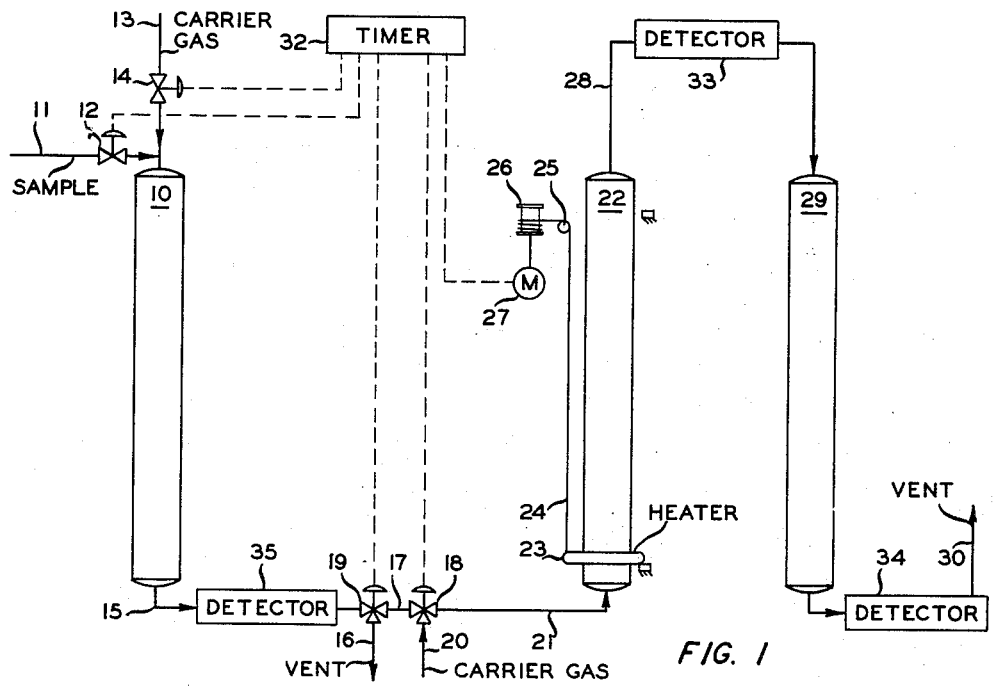
FIGURE 1 is a schematic representation of the analyzer of this invention.

Referring now to the drawing in detail and to FIGURE 1 in particular, there is shown a column 10 which is filled with a packing material that selectively retards the passage therethrough of the constituents of a fluid mixture to be analyzed. A fluid sample to be analyzed is introduced into the inlet of column 10 by means of a conduit 11 which has a control valve 12 therein. Carrier gas is introduced into column 10 by means of a conduit 13 which has a control valve 14 therein. The effluent from column 10 is removed through a conduit 15 which communicates with the inlet of a three-way valve 19. The first outlet of valve 19 communicates with a vent conduit 16. The second outlet of valve 19 is connected by a conduit 17 to the inlet of a second three-way valve 18. Carrier gas is introduced into the second inlet of valve 18 through a conduit 20. The outlet of valve 18 is connected by a conduit 21 to the inlet of a second column 22.

Column 22 is also filled with a material which selectively retards the passage therethrough of the constituents of the fluid mixture to be analyzed. Column 22 is provided with an annular heating element 23 which is in thermal contact with the column. A cable 24 extends from heating element 23 around a guide wheel 25 to a drum 26 which is adapted to be rotated by a motor 27. Rotation of drum 26 thus moves heater 23 along column 22 from the inlet end thereof to the outlet end. The outlet of column 22 is connected by a conduit 28 to the inlet of a third column 29 which is also filled with a material that selectively retards the passage therethrough of the constituents of the fluid mixture to be analyzed. The outlet of column 29 communicates with a vent conduit 30 via detector 34.

Detecting cells 35, 33 and 34 are disposed in respective conduits 15, 28 and 30. These detectors are adapted to measure a property of the fluid mixture directed thereto, which property is representative of the composition of the fluid mixture. The detectors can advantageously comprise thermal conductivity analyzers which include temperature sensitive resistance elements disposed in the path of fluid flow. A reference element, not shown, can be disposed in the carrier gas flow. Such a detector provides signals representative of the difference in thermal conductivity between the column effluents and the carrier gas. The temperature differences between the resistance elements can be measured by electrical bridge circuits, such as a Wheatstone bridge, for example. However, the detectors can also be any other type of apparatus known in the art for measuring a property of a gaseous stream. Refractometers, radiation absorption analyzers and conductivity cells are examples of such apparatus.

Control valves 12, 14, 18 and 19 and motor 27 are operated by a timer 32. This timer provides output signals that operate the valves and motor 27 in the sequence described hereinafter. This timer can be any type of apparatus known in the art for providing control signals in a desired sequence. One common type of timer which can be employed to advantage utilizes a series of cam operated switches wherein the associated cams are rotated by a timing motor.

In order to describe the operation of the analyzer of this invention, reference is made to a specific analysis of a hydrocarbon mixture. Column 10 was formed of twelve feet of ⅜ inch tubing containing 35 to 60 mesh firebrick soaked in dimethyl sulfolane. Column 22 was formed of sixteen inches of ¼ inch tubing containing silica gel. Column 29 was formed of six feet of ¼ inch tubing containing said firebrick soaked in a silicone oil. Helium was employed as the carrier gas and was supplied by each of the conduits 13 and 20 at a rate of 95 cc./minute.

The sample mixture to be analyzed was supplied at the same rate as a vapor.

Figure 2A:
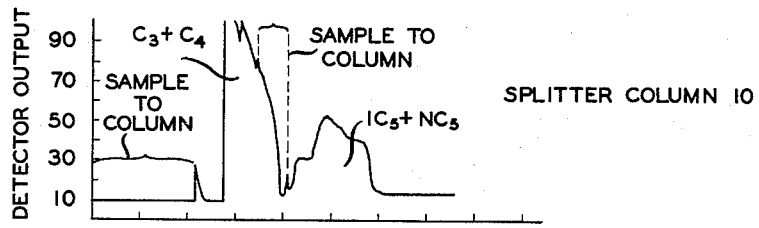
FIGURES 2a, 2b and 2c are graphically representations of operating features of the analyzer of FIGURE 1.
Figure 2B:
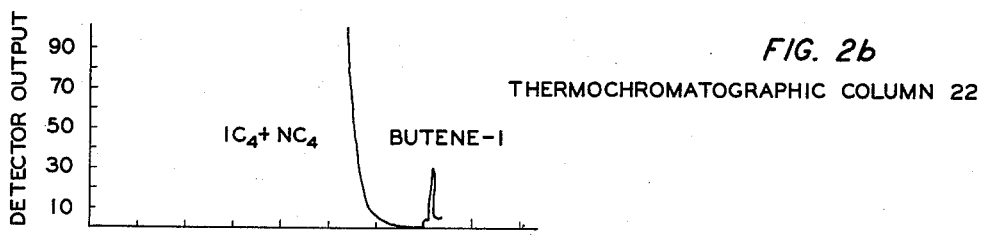
Figure 2C:
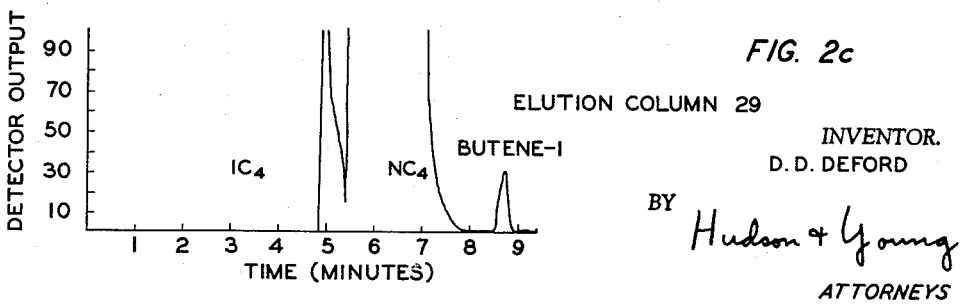

FIGURES 2a, 2b and 2c illustrate the output signals of detectors 35, 33 and 34, respectively. These detectors were thermal conductivity cells. It can be seen from FIGURE 2a that sample was introduced into column 10 for approximately 2¼ minutes. Carrier gas was then introduced through conduit 13. Valve 19 vented the effluent from column 10 through conduit 16 at this time. At time 3½ minutes, valve 19 was actuated to introduce the effluent from column 10 into column 22. This operation continued for approximately ¾ minute. Thereafter, carrier gas was introduced into column 22 from conduit 20 and motor 27 was energized to move heater 23. Heater 23 provided a maximum temperature of approximately 250° F. in column 22 and was moved at a rate of 0.79 cm./second.

It can readily be seen from FIGURES 2a, 2b and 2c that the individual $C_4$ constituents of the fluid sample were separated in the fluent from column 29, whereas there was substantially no separation in the effluent from column 10. There was partial separation in the effluent from column 22. However, this partial separation is sufficient to obtain useful analyses in some operations. It should thus be evident that heater 23 concentrates within a very short distance the constituents of the sample introduced into column 22. This concentration permits substantially larger samples to be supplied to column 10. It should be noted that detector 35 measures constituents of the fluid sample which are present in large concentrations, whereas detector 34 measures the trace constituents. Still greater concentration can be accomplished by adding valves and additional columns such as 19, 18, 22, and 29 to the output of column 29.

The particular packing materials employed in the columns and the carrier gas can be varied, depending upon the type of fluid mixture to be analyzed. Numerous packing materials and carrier gases are, of course, well known in the art.

While the invention has been described in conjunction with present preferred embodiments, it should be evident that it is not limited thereto.

What is claimed is:

1. The method of analyzing fluid mixtures which comprises introducing a fluid mixture containing a constituent of small concentration into the inlet of a first zone which contains a material that selectively retards passage therethrough of the constituents of said mixture, introducing a carrier gas into the inlet of said first zone, passing a part of the effluent from said first zone containing said constituent of small concentration to the inlet of a second zone which contains a material that selectively retards passage therethrough of the constituents of said mixture, progressively heating sections of said second zone from the inlet thereof to the outlet thereof, passing the effluent from said second zone to the inlet of a third zone which contains a material that selectively retards passage therethrough of the constituents of said mixture, and measuring a property of the effluent from said third zone which is representative of the composition thereof.

2. The method of analyzing fluid mixtures which comprises introducing a fluid mixture containing a constituent of small concentration into the inlet of a first zone which contains a material that selectively retards passage therethrough of the constituents of said mixture, introducing a carrier gas into the inlet of said first zone, measuring a property of the effluent from said first zone which is representative of the composition thereof, passing a part of the effluent from said first zone containing said constituent of small concentration to the inlet of a second zone which contains a material that selectively retards passage therethrough of the constituents of said mixture, progressively heating sections of said second zone from the inlet thereof to the outlet thereof, passing a carrier gas into the inlet of said second zone, passing the effluent from said second zone to the inlet of a third zone which contains a material that selectively retards passage therethrough of the constituents of said mixture, and measuring a property of the effluent from said third zone which is representative of the composition thereof.

3. The method of analyzing fluid mixtures which comprises introducing a fluid mixture containing a constituent of small concentration into the inlet of a first zone which contains a material that selectively retards passage therethrough of the constituents of said mixture, introducing a carrier gas into the inlet of said first zone, passing a part of the effluent from said first zone containing said constituent of small concentration to the inlet of a second zone which contains a material that selectively retards passage therethrough of the constituents of said mixture, progressively heating sections of said second zone from the inlet thereof to the outlet thereof, introducing a carrier gas into the inlet of said second zone, passing the effluent from said second zone to the inlet of a third zone which contains a material that selectively retards passage therethrough of the constituents of said mixture, and measuring a property of the effluent from said third zone which is representative of the composition thereof.

References Cited in the file of this patent

UNITED STATES PATENTS

| 2,826,908 | Skarstrom | Mar. 18, 1958 |
| 2,868,011 | Coggeshall | Jan. 13, 1959 |

OTHER REFERENCES

Publication: Gas Chromatography by Keulemans, Reinhold Pub. Corp., N.Y. (1957), page 187.

Publication: Vapor Phase Chromatography by Desty Butterworths Sci. Pub., London 1957, pages 300–301.

Publication: Zavodskaya Laboratoriia, vol. 23, 1957, pages 1120–1124 (Russian), article by Turkel'Taub et al., Chem. Abstr. 53, 5767 (1959).

Analytical Chemistry, vol. 30, Nov. 1958, pages 1859 to 1862, article by Madison.

Journal of Chromatography, vol. 2 (1959), page 19 of article by Hardy et al.